US010516579B2

(12) United States Patent
Hanumanthappa et al.

(10) Patent No.: US 10,516,579 B2
(45) Date of Patent: Dec. 24, 2019

(54) TECHNIQUES FOR RECONCILIATION OF PLANNED NETWORK WITH DEPLOYED NETWORK

(71) Applicant: INFINERA CORPORATION, Sunnyvale, CA (US)

(72) Inventors: Jayaram Hanumanthappa, Bangalore (IN); Naresh Kumar, Bangalore (IN); Naresh Srinivasulu Jayam, Bangalore (IN); Arijit Mandal, Bangalore (IN); Gounda Mohammed Nabi Saheb, Bangalore (IN); Alok Jain, Bangalore (IN); Steven Joseph Hand, Sunnyvale, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 15/378,987

(22) Filed: Dec. 14, 2016

(65) Prior Publication Data
US 2018/0167286 A1    Jun. 14, 2018

(51) Int. Cl.
*H04L 29/00* (2006.01)
*H04L 12/24* (2006.01)
*H04B 10/07* (2013.01)

(52) U.S. Cl.
CPC ........... *H04L 41/145* (2013.01); *H04B 10/07* (2013.01); *H04L 41/12* (2013.01)

(58) Field of Classification Search
CPC .................................................. H04L 41/145
See application file for complete search history.

(56) References Cited

U.S. PATENT DOCUMENTS

| | | | | |
|---|---|---|---|---|
| 8,855,990 | B1* | 10/2014 | Woods | H04L 41/12 703/13 |
| 2002/0102050 | A1* | 8/2002 | Chauvin | H04J 14/0227 385/24 |
| 2009/0290507 | A1* | 11/2009 | Anand | H04L 41/145 370/254 |
| 2010/0325496 | A1* | 12/2010 | Kumar | H04L 41/0806 714/57 |
| 2014/0303953 | A1* | 10/2014 | Bates | G06Q 30/02 703/13 |
| 2017/0347274 | A1* | 11/2017 | Li | H04W 8/26 |
| 2017/0364053 | A1* | 12/2017 | Hadeli | G05B 19/406 |

* cited by examiner

Primary Examiner — Nathan M Cors
(74) Attorney, Agent, or Firm — David L. Soltz

(57) ABSTRACT

Techniques are disclosed herein for reconciling planned data for a network (such as a fiber optic network) with data describing the deployed network. Network probing and planning components obtain a snapshot of the deployed network and organize the snapshot into three "layers": the "link layer," which represents the physical links that underlie the network, the "digital layer," which includes optical channel groups that divide the total capacity of the physical links, and the "service layer," which includes the services delivered over the network. The techniques involve comparing the planned data to the deployed data in the order of link layer, digital layer, and service layer. Differences considered to be "minor" are reconciled automatically. Differences that are "major" are reconciled after receiving instructions from a planner or administrator regarding whether to update the planned data based on what was originally in the planned data or what is in the deployed network.

24 Claims, 4 Drawing Sheets

TECHNIQUES FOR RECONCILIATION OF PLANNED NETWORK WITH DEPLOYED NETWORK

TECHNICAL FIELD

The present disclosure relates to planning network deployments, and, more specifically, to reconciliation of planned networks with deployed networks.

BACKGROUND

Fiber optic networks contain a large number of components that work together to provide communication services. Planning and deploying a network is a complicated task because many parties (e.g., field workers, planners) can be working on different components of the network in different locations. A network planner experiences difficulties related to the fact that the "image" of the network held by the planner may differ from the components and organization of the network that actually exists.

SUMMARY

A method for reconciling planned network data with deployed network data, wherein the planned network data includes data representing an editable representation of a planned network, and wherein the deployed network data includes data indicating a state of a deployed network, is provided. The method includes detecting a difference between a feature of the planned network data and a feature of the deployed network data. The method also includes determining whether the difference between the feature of the planned network data and the feature of the deployed network data is a difference of a first type or a difference of a second type. The method further includes, if the difference between the feature of the planned network data and the feature of the deployed network data is a difference of a first type, replacing the feature of the planned network data with the feature of the deployed network data without prompting a human being for input after determining that the difference between the feature of the planned network data and the feature of the deployed network data is a difference of a first type. The method also includes if the difference between the feature of the planned network data and the feature of the deployed network data is a difference of a second type, prompting the human being for an input, and either replacing the feature of the planned network data with the feature of the deployed network data or maintaining the feature of the planned network data, according to the input.

A computer system for reconciling planned network data with deployed network data, wherein the planned network data includes data representing an editable representation of a planned network, and wherein the deployed network data includes data indicating a state of a deployed network, is provided. The computer system includes a memory storing instructions and a processor configured to execute the instructions, the instructions causing the processor to perform certain steps. The instructions cause the processor to detect a difference between a feature of the planned network data and a feature of the deployed network data. The instructions also cause the processor to determine whether the difference between the feature of the planned network data and the feature of the deployed network data is a difference of a first type or a difference of a second type. The instructions further cause the processor to, if the difference between the feature of the planned network data and the feature of the deployed network data is a difference of a first type, replace the feature of the planned network data with the feature of the deployed network data without prompting a human being for input after determining that the difference between the feature of the planned network data and the feature of the deployed network data is a difference of a first type. The instructions also cause the processor to, if the difference between the feature of the planned network data and the feature of the deployed network data is a difference of a second type, prompt the human being for an input, and either replace the feature of the planned network data with the feature of the deployed network data or maintain the feature of the planned network data, according to the input.

A non-transitory computer-readable medium storing instructions that, when executed by a processor, cause the processor to perform a method for reconciling planned network data with deployed network data, wherein the planned network data includes data representing an editable representation of a planned network, and wherein the deployed network data includes data indicating a state of a deployed network, is also provided. The method includes detecting a difference between a feature of the planned network data and a feature of the deployed network data. The method also includes determining whether the difference between the feature of the planned network data and the feature of the deployed network data is a difference of a first type or a difference of a second type. The method further includes, if the difference between the feature of the planned network data and the feature of the deployed network data is a difference of a first type, replacing the feature of the planned network data with the feature of the deployed network data without prompting a human being for input after determining that the difference between the feature of the planned network data and the feature of the deployed network data is a difference of a first type. The method also includes if the difference between the feature of the planned network data and the feature of the deployed network data is a difference of a second type, prompting the human being for an input, and either replacing the feature of the planned network data with the feature of the deployed network data or maintaining the feature of the planned network data, according to the input.

DETAILED DESCRIPTION

Figure 1:
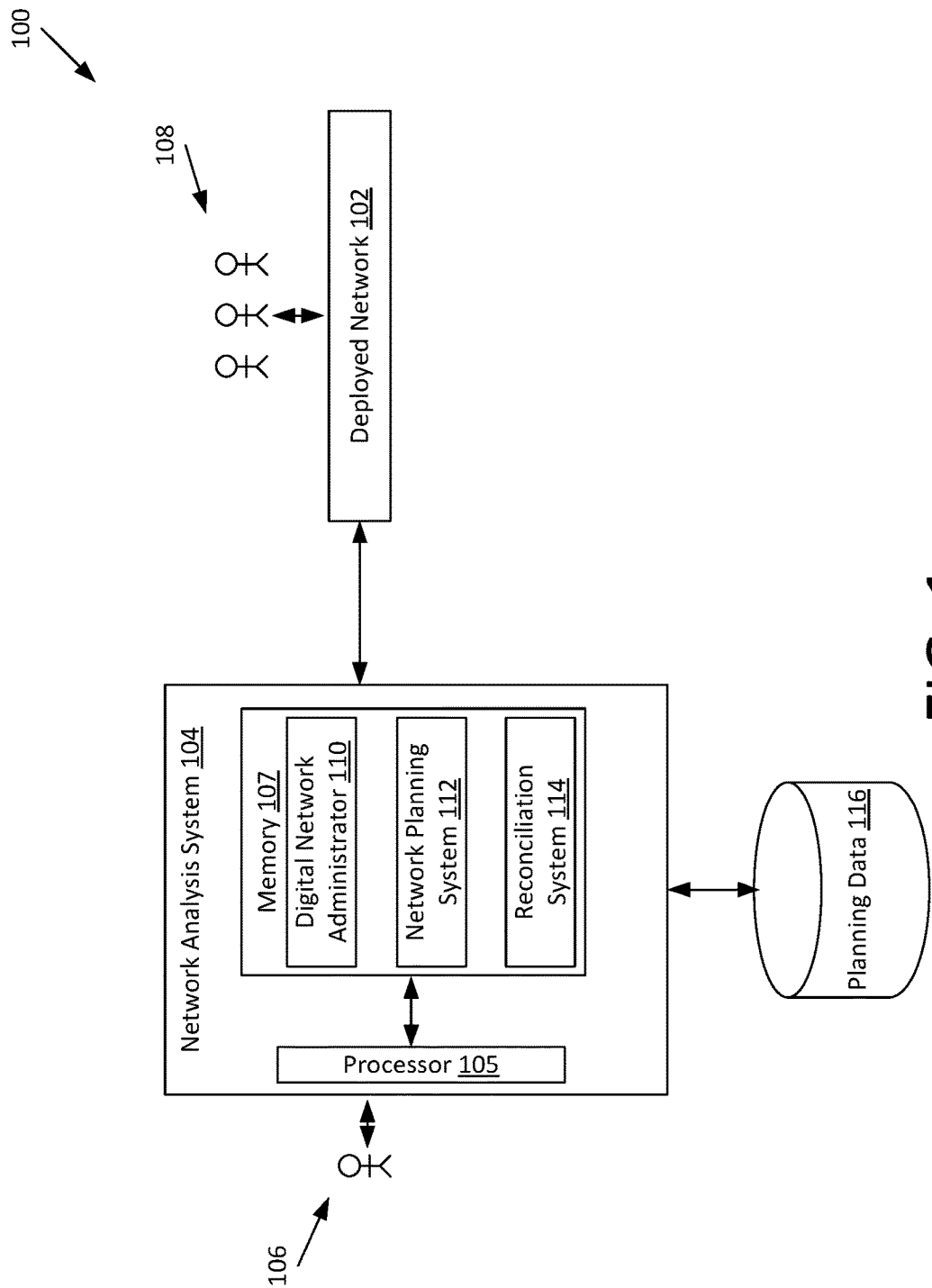
FIG. 1 is a block diagram of a network system, according to an example.

Techniques are disclosed herein for reconciling planned data for a network (such as a fiber optic network) with data describing a deployed network. "Reconciling" planned data with data describing the deployed network means detecting differences between the planned data and the deployed network data, and, for each specific difference, deciding whether to update the planned data by incorporating the data from the deployed network or to keep the planned data the same and not modify the planned data. The data from the deployed network is read-only (as it reflects an actual physical network in existence) and is not modified (except that certain elements of the deployed network may be "ignored" or removed from consideration in the reconciliation technique, as described in more detail below). At the end of the reconciliation technique, the planned data, as updated by the reconciliation technique, is likely to be somewhere in an intermediate state between the original planned data and the state of the deployed network, although it is possible for the planned data to stay the same (thus reflecting the original planned data completely) or to be altered to fully reflect the deployed network. A network administrator may then continue to edit the planned data as desired.

To perform the reconciliation technique, network probing and planning components (such as the Digital Network Administrator and Network Planning System products available from Infinera Corporation of Sunnyvale, Calif.) obtain a snapshot of the deployed network and organize the snapshot into three "layers." The first layer, the "link layer," represents the physical links that underlie the network. The second network, the "digital layer," includes optical channel groups that divide the total capacity of the physical links for different uses. The third layer, the "service layer," includes the services that represent capacity demanded or requested by parties (by customers or clients) that use the network.

The techniques involve comparing the planned data to the deployed data in the order of link layer, digital layer, and service layer. This order is used because changes to the link layer will affect the digital layer and service layer (and thus should be reconciled first) and changes to the digital layer will affect the service layer (and thus should be reconciled second). Differences between the planned data and the deployed data are then reconciled. For example, differences in elements of the planned data and the deployed data that are considered to be "minor" differences are reconciled automatically, while differences considered to be "major" are reconciled manually, by receiving instructions from a human being, such as a planner or administrator regarding whether to maintain the element, in the planned data, as originally specified in the planned data, or to substitute, in the planned data, the element as specified in the deployed data. Generally speaking, minor differences are those that do not affect capacity of the network represented by the planned data or do not change the capabilities of the network represented by the planned data. Minor differences may also include differences that increase the capacity of the network represented by the planned data or that increase the capabilities of the network represented by the planned data. Major differences are those that decrease the capacity or capabilities of the network represented by the planned data. A human being, such as an administrator, is able to change what types of differences are considered minor and what types are considered major.

Automatic reconciliation includes automatically incorporating the element of the deployed data into the planned data, overwriting the corresponding element in the planned data. Differences considered to be "major" are reconciled "manually," by receiving instructions from a human being, such as a planner or administrator, regarding whether to maintain the element, in the planned data, as originally specified in the planned data, or to substitute, in the planned data, the element as specified in the deployed data. Automatic reconciliation of a difference involves applying one or more changes to reconcile the difference without a human being, such as a network planner or administrator, specifying what change(s) should be made after the difference is identified. Manual reconciliation of a difference involves prompting a human being, such as a network planner or administrator, to specify the manner in which to reconcile the difference after the difference is identified. Manual resolution then involves applying the change(s) specified by the human being to resolve the difference. After resolution of all identified differences, the planned data includes, for each resolved difference, either the data that was originally in the planned data or the data representing the deployed network. This resolution technique allows for incorporation, into the planned data, of changes to the deployed network that occur after planning had begun, while also allowing flexibility in incorporating such changes by allowing someone, such as a network planner or administrator, to "override" incorporation of data from the deployed network if desired or to "allow" such incorporation to occur, on a per-difference basis.

Various example embodiments are illustrated herein. Example embodiments of the inventive concepts may, however, be embodied in many different forms and should not be construed as being limited to the embodiments set forth herein; rather, these embodiments are provided so that this disclosure will be thorough and complete, and will fully convey the concept of example embodiments to those of ordinary skill in the art.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the this specification and the relevant art and will not be interpreted in an idealized or overly formal sense unless expressly so defined herein.

FIG. 1 is a block diagram of a network system 100, according to an example. As shown, the network system 100 includes a deployed network 102 and a network analysis system 104. In some examples, the deployed network 102 is a network of nodes connected by optical communication paths, including optical fibers, for example, and is configured for transmitting data between various locations. The deployed network 102 includes a large number of different types of hardware units for performing various types of functionality related to transmitting data. Additional details regarding the hardware units of the deployed network 102 are provided below.

In contrast to the deployed network 102, which is the actual, physical network as that network is actually configured, the planned data 116, which is coupled to (or stored within) the network analysis system 104 represents a planned network that might be actually deployed at a later date (e.g., by modifying the deployed network 102). That is, the planned data 116 is a working representation of a physical network that can be used by an administrator 106 to plan out changes to the deployed network 102.

The network analysis system 104 includes a digital network administrator 110, a network planning system 112, and a reconciliation system 114. Although illustrated as a separate component, in some examples, the reconciliation system 114 is included in the network planning system 112. In one example, the network analysis system 104 is a computer or collection of computers networked together and each of the elements depicted as being within the network analysis system 104 are computer software programs executing on the network analysis system 104. In this example, the network analysis system 104 includes a processor 105 and a memory 107 storing instructions for execution by the processor. When executing the software programs described above, instructions that correspond to part or all of the software are stored in the memory 107 for execution by the processor 105. When the processor 105 executes the instructions, the processor 105 performs the functionality described herein. In other examples, the network analysis system 104 may be embodied as hard-wired electronics, with portions of the hard-wired electronics corresponding to each of the elements depicted within the network analysis system 104.

The digital network administrator 110 is configured to probe the deployed network 102 to obtain data that indicates the actual configuration of the deployed network 102. The digital network administrator 110 provides this information to the network planning system 112 (e.g., upon request, per a schedule, or in response to some other event occurring). The network planning system 112 uses this information, which represents a "snapshot" of the deployed network 102, to present the administrator 106 with an editable view of the deployed network 102. The administrator 106 can edit that snapshot to plan out changes to the deployed network 102. The administrator 106 is also able to plan an entire network from scratch, by requesting a blank network plan from the network planning system 112 and making edits to that blank network as desired. The network planning system 112 stores edited versions of planned networks in planned data 116 for later retrieval if desired. An example product that corresponds to the digital network administrator 110 is the Digital Network Administrator software suite, available from Infinera Corporation of Sunnyvale, Calif. An example product that corresponds to the network planning system 112 is the Network Planning System software suite, also available from Infinera Corporation of Sunnyvale, Calif.

The reconciliation system 114 reconciles differences between a planned network, stored in planned data 116, and the deployed network 102. Reconciliation may occur upon receiving a request for reconciliation from the administrator 106. Reconciliation includes detecting differences between a planned network and the deployed network and reconciling the differences either automatically or by requesting manual correction by the administrator 106 or another person. Whether differences are corrected automatically or manually is based on the type of difference that is detected and based on editable configuration data, stored in the network analysis system 104, that indicates whether a particular type of difference is reconciled automatically or manually. Reconciliation involves, on an element-by-element basis (where "element" refers to various characteristics of links 206, optical channel groups 204, or services 208, discussed in more detail below), either modifying the planned data 116 to incorporate an element from the deployed network 102 or maintaining the element in the planned data 116 as that element originally (i.e., before reconciliation begun) existed in the planned data 116.

There several reasons why reconciliation is desirable. In one instance, the administrator 106 has obtained a snapshot of the deployed network 102 at a certain point in time, via the network planning system 112, and edits this snapshot to generate a new planned network. At some point after taking the snapshot, field workers 108 modify the deployed network 102 in some manner. These modifications may relate to aspects of the network that are not modified by the administrator 106 during planning or may relate to aspects of the network that are modified by the administrator 106 during planning. In either case, an aspect of the network, as planned by the administrator 106, is different from an aspect of the actually deployed network 102. This difference may have bearing on the choices made by the administrator 106 in planning further changes to the network or in actually modifying the deployed network 102 based on the planned network. Thus the differences between the planned network and the deployed network 102 should be taken into account before making further changes to the planned network and/or eventual use of the planned network in modifying the deployed network 102. Reconciliation thus involves determining whether to incorporate, into the planned data, the features of the deployed network that are different from the planned data, or whether to retain the differing feature as planned (i.e., retain, in the planned data, the feature as specified by the planned data before the reconciliation technique began). The purpose of reconciliation is to allow for the planned data to reflect updates to the deployed network made since the original snapshot was taken, but to allow for this to occur with flexibility, in that an administrator is able to decide, for certain types of differences (referred to as "major differences"), whether to incorporate the feature as reflected in the deployed network 102 or to maintain the feature as reflected in the planned data. Thus, if a change is made to the deployed network that is undesirable in terms of planning out the network, an administrator is able to indicate that such change should not be reflected in the planned data. Additional details of the reconciliation techniques are discussed in further detail below.

Figure 2:
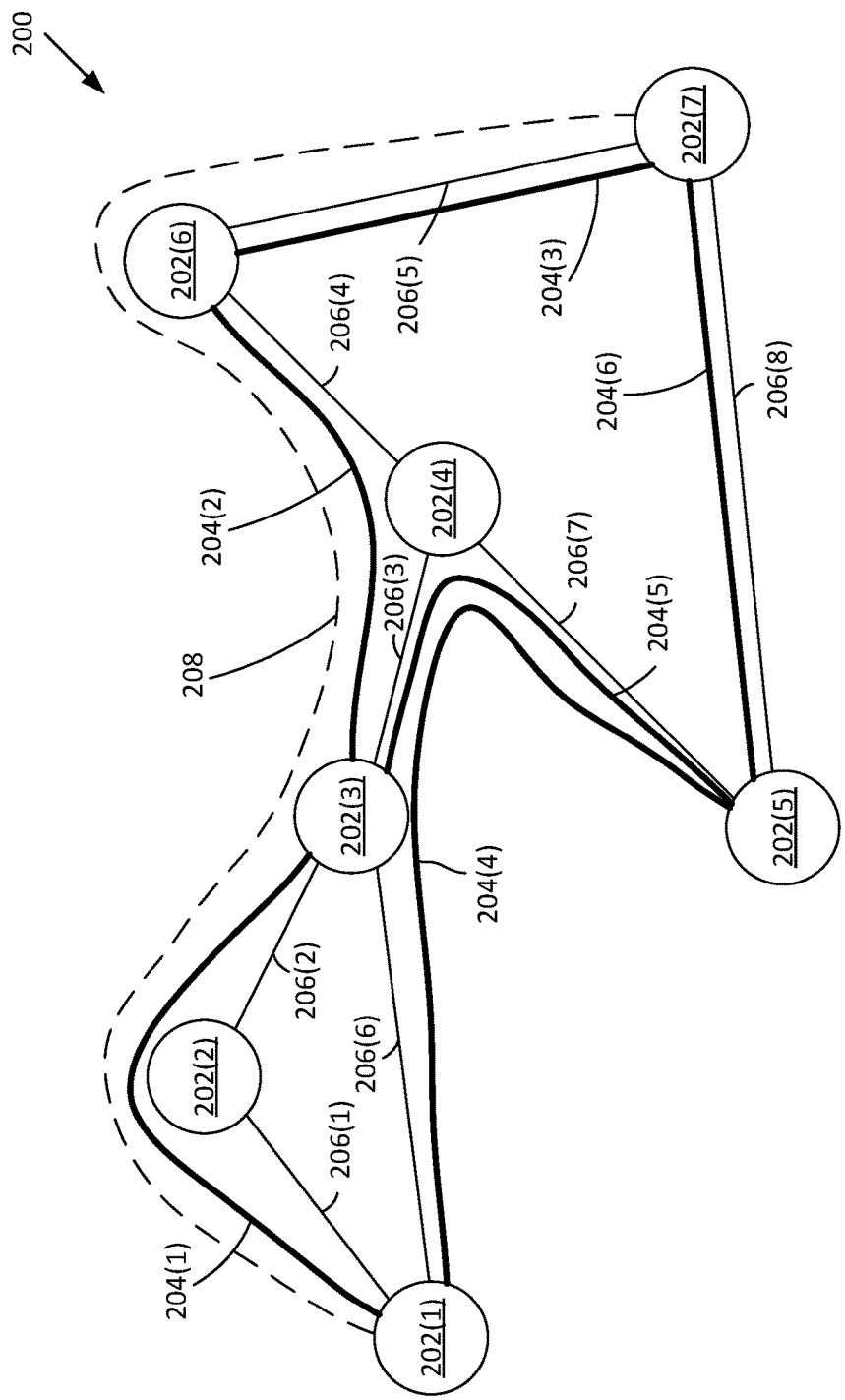
FIG. 2 is a schematic diagram of a network, such as the deployed network or a planned network stored in planned data, according to an example.

FIG. 2 is a schematic diagram of a network 200, such as the deployed network 102 or a planned network stored in planned data 116, according to an example. The network 200 includes physical entities such as nodes 202 and physical links 206. Logical entities, including optical channel groups 204 and services 208 are also depicted. Reference number 202 refers to one or more of 202(1) through 202(7). Similarly, reference number 204 refers to one or more of optical channel groups 204(1) through 204(6) and reference number 206 refers to one or more of links 206(1) through 206(8).

Wavelength division multiplexed (WDM) signals are transmitted between nodes 202. Each WDM signal includes a plurality of optical signals or channels, each having a different wavelength. These optical channels may be grouped into optical channel groups 204 ("OCGs"), which are groups of individual optical signals. Each OCG may have an identifier such as OCG 1, OCG 2, or the like. The optical signal wavelengths in a given OCG may be, for example, 1577.03 nm, 1576.20 nm, 1575.37 nm, or the like.

A single optical channel group 204 may span or traverse multiple links 206. Each optical channel group 204 may be within a particular range of optical frequencies or wavelengths associated with a particular link 206 over which the optical channel group 204 travels. Links 206 can thus carry multiple optical channel groups 204. Additionally, optical channel groups 204 can be said to consume at least a portion of the transmitting capacity of any particular link 206. For any particular OCG 204, the wavelengths occupied by that OCG 204 in a particular link 206 are the same wavelengths occupied by that OCG 204 in a different link 206.

Nodes 202 are physical hardware devices that act as terminating points of an optical fiber. Links 206 between nodes 202 may include one or more optical fibers connected to two different nodes 202. Each link 206 may carry optical signals, each having a particular wavelength, from one node 202 to another node 202. (These optical signals are the components of the WDM signal). In each node 202, a plurality of optical transmitters may be provided that generate each of the optical signals. Each optical signal is modulated to carry data and is combined, via a multiplexer, to form the WDM signal. The WDM signal is then transmitted to a receive end (e.g., another node 202) of the link 206.

A node 202 that receives a WDM signal may separate or "demultiplex" certain portions of the WDM signal into portions that correspond to different OCGs 204. The node 202 may transmit portions corresponding to some OCGs 204 to other nodes 202. A node 202 that terminates an OCG 204 further separates or demultiplexes portions corresponding to the terminating OCG 204 into individual optical signals of the OCG 204 and converts the optical signals to corresponding electrical signals subject to further processing.

Each optical signal within an OCG 204 is modulated such that the data is carried as a series of frames. Each frame or packet may include a header with control or monitoring information and a payload that carries the actual data. Services 208 represent data transmission payloads to be delivered across the network 200. Services 208 are transmitted via one or more certain optical channel groups 204. Examples of services 208 include transmission of a particular data rate (e.g., 50 Mb/s, 150 Mb/s, 600 Mb/s) between a first location and a second location. Some example specifications for services 208 include the OC-1 specification, the OC-3 specification, the OC-3c specification, the OC-12 specification, the OC-24 specification, the OC-48 specification, the OC-192 specification, and the OC-768 specification, for use in Synchronous Optical Network ("SONET") fiber optic networks. Other examples of payloads include various optical transport network ("OTN") payloads or gigabit Ethernet payloads.

In the example network 200 illustrated in FIG. 2, seven different nodes 202 are shown (node 202(1) through node 202(7)). Eight different links 206 are shown (links 206(1) through 206(8)). Six different optical channel groups 204 are shown (optical channel groups 204(1) through 204(6)). One example service 208 is shown.

Link 206(1) couples node 202(1) to node 202(2). Link 206(2) couples node 202(2) to node 202(3). Link 206(3) couples node 202(3) to node 202(4). Link 206(4) couples node 202(4) to node 202(6). Link 206(5) couples node 202(6) to node 202(7). Link 206(6) couples node 202(1) to node 202(3). Link 206(7) couples node 202(4) to node 202(5). Link 206(8) couples node 202(5) to node 202(7).

Optical channel group 204(1) spans link 206(1) and link 206(2). Optical channel group 204(2) spans link 206(3) and link 206(4). Optical channel group 204(3) spans link 206(5). Optical channel group 204(4) spans link 206(6), link 206(3), and link 206(7). Optical channel group 204(5) spans link 206(7) an link 206(3). Optical channel group 204(6) spans link 206(8). The service 208 traverses optical channel group 204(1), optical channel group 204(2), and optical channel group 204(3).

Figure 3A:
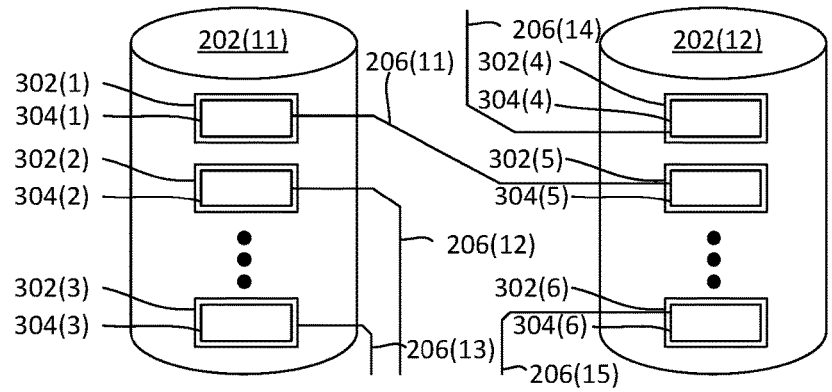
FIGS. 3A-3C illustrate additional details related to nodes, links, optical channel groups, and services of a network, according to some examples.
Figure 3B:
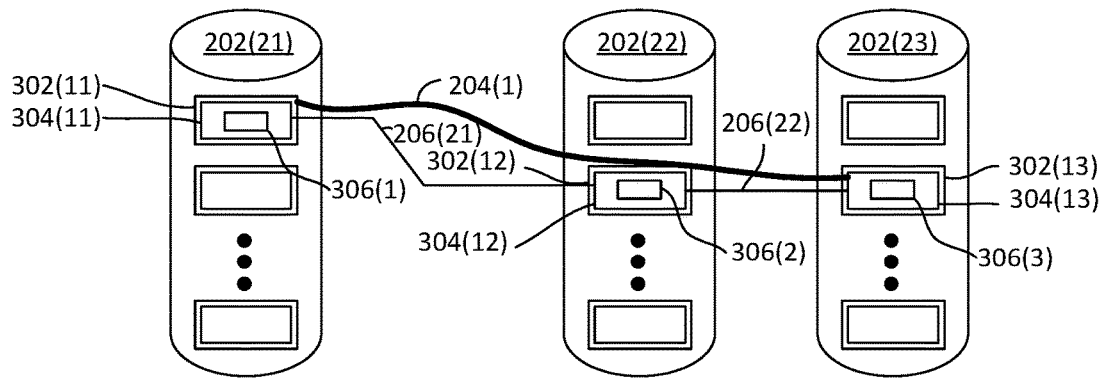
Figure 3C:
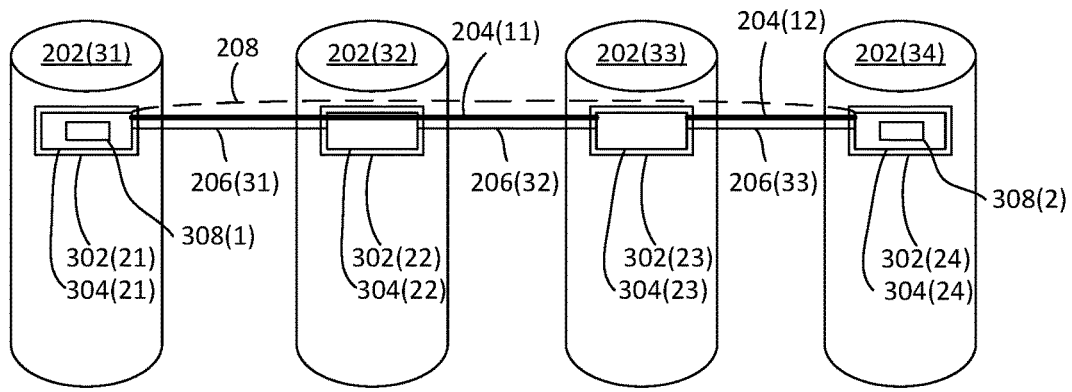

FIGS. 3A-3C illustrate additional details related to nodes 202, links 206, optical channel groups 204, and services 208, according to some examples. In the discussion herein, reference numbers 302, 304, 306, and 308 refer to one or more specific instances, such as 302(1), 304(1), 306(1), or 308(1), respectively. FIG. 3A is a schematic diagram illustrating hardware aspects of nodes 202 and links 206, according to an example. FIG. 3A illustrates two nodes 202(11) and 202(12) coupled together via a link 206(11). Within the nodes 202, the link 206(11) terminates on transponders 304(1) and 304(5) installed in physical slots 302(1) and 302(5), respectively, within the nodes 202(11) and 202(12). The transponders 304 are hardware devices that receive and transmit optical signals and that are able to convert the optical signals to electrical signals for processing. The slots 302 are physical receptacles for transponders 304. Each slot 302 has a unique identifier and each node 202 has a unique identifier. Each link 206 is uniquely identified by the slot identifier and the node identifier of the two nodes 202 coupled to that link 206. Links 206 other than the link 206(11) that couples the two nodes 202(11) and 202(12) are illustrated as well. These additional links 206 are connected to other nodes 202 not illustrated in FIG. 3A. In addition to the slots 302 and transponders 304, the nodes 202 each include routing circuitry and logic for communicating between the transponders 304, as well as other hardware and software for performing other functions for managing network traffic. Examples of nodes include the DTN, DTN-X, and FLEX series of equipment, available from Infinera Corporation of Sunnyvale, Calif.

FIG. 3B is a schematic diagram illustrating hardware aspects of optical channel groups 204, according to an example. FIG. 3B illustrates three nodes 202(21), 202(22), and 202(23), and two links 206(21) and 206(22). Each node 202 has several slots 302, each including a transponder 304 (which, in some embodiments, is a muxponder). The transponders 304 receive and transmit optical signals across links 206. The transponders 304 connect to optical multiplexors 306 that combine distinct optical signals for transmissions across the links 206 (e.g., to form the optical channel groups 204 and the WDM signals). Optical channel groups 204 are defined at least in part by the links 206 that the optical channel groups 204 span. Thus, optical channel groups 204 are defined at least in part by the node identifiers and slot identifiers that uniquely identify those links 206. Optical channel groups 204 are also defined at least in part by the transponder 304 on the terminating nodes (e.g., the nodes between which the OCGs 204 span) and by the multiplexors 306 connected to those transponders 304.

FIG. 3C is a schematic diagram illustrating hardware aspects related to services 208, according to an example. Services 208 are uniquely characterized by the optical channel groups 204 across which the services 208 span. In FIG. 3C, the service 208 shown spans the two optical channel groups 204(11) and 204(12) shown. Additionally, because the optical channel groups 204 are characterized by certain link characteristics, services 208 are implicitly characterized by the link characteristics of the links 206 included in the optical channel groups 204 across which the services 208 span. Thus, in FIG. 3C, the service 208 shown is characterized by link characteristics (such as internet protocol address of a transponder 304 that is part of the link, gain of an amplifier that is part of the link, signal transmission characteristics and loss characteristics of the link, transmission distance of the link, optical fiber type of the fiber that constitutes the link, a slot 302 identifier for the link, or other characteristics) of the links 206(31), 206(32), and 206(33). Services 208 are also characterized by the specific payload data that the service carries, such as OC-1 specification payload, OC-3 specification payload and others described above. Services 208 are further characterized by the terminating service equipment 308 resident within the nodes 202 that are the endpoints of the service 208. For example, the service 208 illustrated in FIG. 3C is characterized by characteristics of the terminating service equipment 308(1) and the terminating service equipment 308(2). The terminating equipment 308 is the interface between the network and the client signal that is to be carried. Examples of terminating equipment includes TOM (Tributary Optical Module) such as described in U.S. Pat. No. 8,477,596, the entire contents of which are incorporated herein by reference.

As described above, data for the links 206, OCGs 204, and services 208 may be different in the planned network as compared with the deployed network 102. These differences may occur for various reasons. In one example, the administrator 106 takes a snapshot of the deployed network 102 using the digital network administrator 110 and edits the snapshot to create a planned network. However, field workers 108 may alter aspects of the deployed network 102 after that snapshot was taken, leading to inconsistencies.

Figure 4:
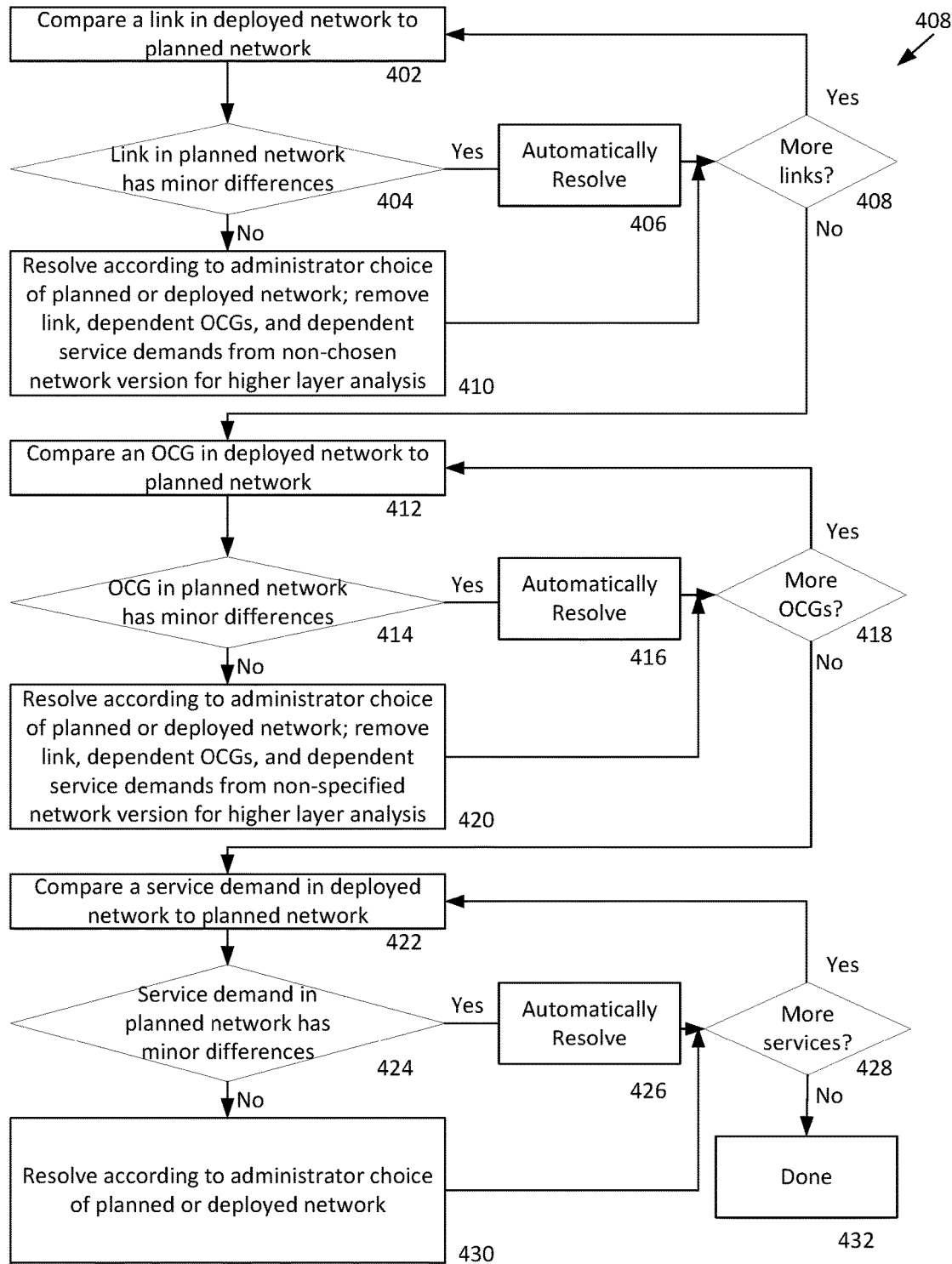
FIG. 4 is a flow diagram of a method for reconciling planned network data with deployed network data, according to an example.

FIG. 4 is a flow diagram of a method 400 for reconciling planned network data with deployed network data, according to an example. Although described with respect to the system shown and described in conjunction with FIGS. 1-2 and 3A-3C, it should be understood that any system configured to perform the method, in any technically feasible order, falls within the scope of the present disclosure.

In the discussion below, references to effects (such as reduction or increase) on capacity, features, performance, capabilities, or the like, refers to effects on the planned network, and not to effects on the deployed network. Thus, for example, the phrase "reduction in link capacity" refers to a reduction in capacity of a link in the planned network. Further, the effects on the planned network are with respect to an original pre-reconciliation version of the planned network. For example, the phrase "reduction in link capacity" means that the capacity of the link is reduced as compared with the link in the original, pre-reconciliation version of the planned network. Thus, if data corresponding to a particular feature is automatically incorporated from the deployed network into the planned network because such a change "would not reduce link capacity," then this means that the change would not cause the link capacity of the link to be reduced as compared with the link capacity of that link before reconciliation occurred.

As shown, the method 400 begins at step 402, where the reconciliation system 114 compares a link 206 of the deployed network 102 to a link 206 in a planned network (stored, e.g., in planned data 116). At step 404, the reconciliation system 114 determines whether the link 206 in the planned network has minor differences with the link 206 in the deployed network. If there are minor differences, then the method proceeds to step 406 and if there are major differences (rather than minor differences), then the method proceeds to step 410.

Minor differences between a link 206 in the planned network and corresponding link 206 in the deployed network 102 include any difference that does not decrease the capacity of the link 106. For example, minor differences for links include an addition in the deployed network (e.g., a new link 206 in the deployed network) that does not exist in the planned network, a change in a characteristic of an existing link 206 that is considered "trivial," or a change that increases the capacity of the link 206. Any of these minor differences can be "automatically reconciled" (step 406).

"Trivial" changes generally include changes to numerical identifiers related to the link 206 (e.g., a change to an IP address of a transponder 304), or changes to other aspects that do not affect capacity of the link 206. Differences that reduce capacity or abilities from the network are considered to be "major" differences for links.

Some examples of minor differences for links include: a change in internet protocol address of a transponder 304 that is a part of the link 206, an increase in amplifier ability (e.g., increased gain) included in or working in conjunction with the transponder 304 (where an amplifier is an optical signal amplifier that amplifies signals output from the transponder 304) that does not result in a reduction in capabilities of the link 206, a change in amplifier gain that would not result in a reduction in capacity of the link 206, a reduction in loss properties of the link 206 (e.g., reduced signal loss), an increase in maximum rated transmission distance of the link 206 (e.g., the maximum physical difference that the link 206 can traverse), a change in the type of the optical fiber that connects the two nodes 202 that does not result in a reduction in link capacity of the link 206, and other changes that do not result in a reduction in link capacity of the link 206.

Some examples of major differences for links include a change in slot 302 for one or both of the transponders 304, or changes that would result in a reduction in link capacity, such a change in amplifier (e.g., a reduction in amplifier gain) that would result in a reduction in link capacity, a change in fiber type that would result in a reduction in link capacity, a change in transmission distance that would result in a reduction in link capacity, a change in fiber-related losses that would result in a reduction in link capacity, or other changes of the link 206 that would result in a reduction in link capacity.

At step 406, the reconciliation system 114 performs automatic resolution, which includes changing the planned data to include, in the planned data, the aspect of the link 206 in the deployed network 102 that is identified as different than the aspect of the link 206 in the planned data. In other words, automatic resolution involves incorporating the differing feature from the deployed network into the planned data. For the purpose of the method 400 illustrated in FIG. 4, no difference between the link 206 in the planned network and the link 206 in the deployed network is considered to be a "minor difference" and "automatic resolution" involves taking no corrective action. Any increase in link capacity or any change that has no impact on the link capacity is considered a "minor difference" and is automatically incorporated from the deployed network into the planned network because increases in link capacity would not result in an invalidation of aspects of the planned design. In other words, an increase in link capacity, or a change that has no impact on link capacity, does not prohibit implementation of the features specified in the planned network. Thus the reconciliation system 114 automatically updates the planned network with such changes.

After step 406, the method proceeds to step 408, where the reconciliation system 114 determines whether there are any more links 206 in the planned network or the deployed network that have not yet been examined. If another link 206 exists, then the method returns to step 402 and if no such links 206 exist, then the method 400 proceeds to step 412.

Returning to step 404, if the differences between the link 206 in the planned network and the link 206 in the deployed network are not minor—that is, are considered "major"—then the method 400 proceeds to step 410. At step 410, the reconciliation system 114 reconciles the difference according to an administrator choice of either the data stored in the planned network or the data reflected in the deployed network. More specifically, the reconciliation system 114 obtains a reconciliation input from an administrator that indicates whether to reconcile the difference by maintaining the differing feature in the planned network in original form (i.e., no change to the planned network for that specific difference) or to update the differing feature by incorporating the data for that feature from the deployed network. In one example, a major difference (i.e., a feature in the deployed network that would reduce the capacity of a corresponding link 206 in the planned network if incorporated into the planned network) between link fiber type is detected between a link 206 included in the planned network and a corresponding link 206 included in the deployed network. In response, the reconciliation system 114 prompts an administrator on whether to reconcile this difference by incorporating the link fiber type from the deployed network or whether to maintain the link fiber type as indicated in the planned network and either incorporates the link fiber type from the deployed network into the planned network or keeps the planned network as it was, based on the administrator input.

Further, the reconciliation system 114 removes, from the data that is to be analyzed in the future for the unchosen version (planned or deployed), the link 206 for which the major differences occurred, as well as any OCGs (optical channel groups) 204 and services 208 that are dependent on that link 206. For example, if the administrator chose to incorporate data from the deployed network, then OCGs 204 in the planned network that include the link 206 that is not chosen for incorporation are ignored when reconciling OCGs (steps 412-420) 204 and services 208 in the planned network that include the link 206 that is not chosen for incorporation are ignored when reconciling services (steps 422-430) 208. Likewise, if the administrator chose to maintain the data in the planned network, then OCGs 204 in the deployed network that include the link 206 that is not chosen for incorporation are ignored when reconciling OCGs (steps 412-420) 204 and services 208 in the deployed network that include the link 206 that is not chosen for incorporation are ignored when reconciling services (steps 422-430) 208. OCGs 204 and services 208 are ignored in this manner because those elements cannot exist without the physical links 206 that support them. Thus it is unnecessary to analyze such elements for conflict.

After step 410, the method 400 proceeds to step 408, where the reconciliation system 114 determines whether any additional links 206 for analysis exist. If more links 206 exist, then the method 400 returns to step 402 and if more links 206 do exist, then the method 400 proceeds to step 412.

At step 412, the reconciliation system 114 compares an OCG 204 in the deployed network to an OCG 204 in the planned network. At step 414, the reconciliation system 114 determines whether minor differences exist between the OCG 204 in the deployed network and the OCG 204 in the planned network. If there are minor differences, then the method 400 proceeds to step 416 and if there are major differences, then the method proceeds to step 420.

Minor differences for OCGs 204 include either an addition in the deployed network (e.g., a new OCG 204 in the deployed network) that does not exist in the planned network or a change in a characteristic of an existing OCG 204 that is considered "trivial" and that can therefore be automatically reconciled (step 416). Automatic resolution for a newly added OCG 204 simply includes adding the newly added OCG 204 to the planned network. "Trivial" differences generally include differences that add capacity or abilities to the network or differences that do not reduce capacity or abilities to the network. Differences that reduce capacity or abilities from the network are considered to be "major" differences.

Some examples of minor differences for OCGs 204 include minor differences for any of the links 206 that make up the OCG 204, as described above. A change in optical frequency group assigned to the OCG 204 is a minor difference if that change does not cause the OCG 204 to use the same optical frequency group across the same link 206 as another OCG 204. If the change does cause the OCG 204 to use the same optical frequency group across the same link 206 as another OCG 204, then that change is considered a major change.

Some examples of "major" differences for OCGs 204 include changes in the links 206 across which the OCG 204 spans, changes in digital layer terminating equipment (e.g., the transponders 304) (which is equipment within nodes 202 that convert between electronic signals and optical signals for transmission across links 206), a commercial example of which is AOFX-500-T4-1-C8 or XT-5005-10-105, both commercially available from Infinera Corporation of Sunnyvale, Calif.), differences in multiplexors 306 through which the signals of the OCGs 204 flow, a reduction or increase in capacity (e.g., digital bandwidth (e.g., bits per second)) of the OCG 204, a change in modulation of the optical signal of the OCGs 204 (which can be, for example, quadrature phase shift keying, binary phase shift keying, or other modulation types), or other differences that reduce the capabilities of the OCG 204 such as associated Optical Transport Network ("OTN") hierarchy differences such as a change from OTU3 to OTU4 (where "OTU3" and "OTU4" are rates specified in the G.709 recommendation of the international telecommunication standardization sector (ITU-T)). Another "major" difference is a difference in the optical signal wavelengths such that one or more optical signals in a first OCG 204 transmitted on a link 206 have the same wavelengths as one or more optical signals in a second OCG 204 transmitted on the link 206 (i.e., a change that causes two OCGs 204 to have "overlapping wavelengths" in different links 206).

For the purpose of the method 400 illustrated in FIG. 4, no difference between the OCG 204 in the planned network and the OCG 204 in the deployed network is considered to be a "minor difference" and "automatic resolution" (step 416) involves taking no corrective action. Any change in the OCG 204 that does not put the OCG 204 in conflict with another OCG 204 is considered a "minor difference" and is automatically incorporated from the deployed network into the planned network because such changes would not result in invalidation of aspects of the planned design. Thus, the reconciliation system 114 automatically updates the planned network with such changes.

As described above, if the OCG 204 in the planned network has minor differences with the OCG 204 in the deployed network, the method 400 proceeds to step 416, where the differences are automatically reconciled. Automatic resolution includes incorporating the data from the deployed network to the planned network so that the "minor" differences are nonetheless properly reflected in the planned network. After automatically reconciling the differences, the method proceeds to step 418, where the reconciliation system 114 determines whether there are more OCGs 204 to analyze. If there are no more OCGs 204, then the method 400 proceeds to step 422 and if there are more OCGs 204, then the method returns to step 412.

If, at step 414, the reconciliation system 114 determines that there is a major difference between an OCG 204 in the planned network and an OCG 204 in the deployed network, then the method proceeds to step 420 to reconcile this conflict. At step 420, the reconciliation system 114 reconciles the difference according to an administrator choice of either the data stored in the planned network or the data reflected in the deployed network. More specifically, the reconciliation system 114 obtains a reconciliation input from an administrator that indicates whether to reconcile the difference by maintaining the differing feature in the planned network in original form (i.e., no change to the planned network for that specific difference) or to update the differing feature by incorporating the data for that feature from the deployed network.

Further, the reconciliation system 114 removes, from the data that is to be analyzed in the future for the unchosen version (planned or deployed), the OCG 204 for which the major differences occurred, as well as any services 208 that are dependent on that OCG 204. For example, if the administrator chooses to incorporate data from the deployed network into the planned network, then services 208 in the planned network that include the OCG 204 that is not chosen for incorporation are ignored when reconciling services (steps 422-430) 208. Likewise, if the administrator chose to maintain the planned network in original (pre-reconciliation) form and not to incorporate the differing feature as reflected in the deployed network 102, then services 208 in the deployed network 102 that include the OCG 204 that is not chosen for incorporation are ignored when reconciling services (steps 422-430) 208. Services 208 are ignored in this manner because those elements cannot exist without the OCGs 204 that support them. Thus it is unnecessary to analyze such elements for conflict.

After step 420, the method 400 proceeds to step 418, where the reconciliation system 114 determines whether any additional OCGs 204 for analysis exist. If more links 206 exist, then the method 400 returns to step 412 and if OCGs 204 do exist, then the method 400 proceeds to step 422.

At step 422, the reconciliation system 114 compares a service 208 in the deployed network to a service 208 in the planned network. At step 424, the reconciliation system 114 determines whether minor differences exist between the service 208 in the deployed network and the service 208 in the planned network. If there are minor differences, then the method 400 proceeds to step 426 and if there are major differences, then the method proceeds to step 430.

Minor differences for services 208 include either an addition in the deployed network (e.g., a new service 208 in the deployed network) that does not exist in the planned network and that does not cause a conflict with an already existing service 208 in the planned network or a change in a characteristic of an existing service 208 that is considered "trivial" and that can therefore be automatically reconciled (step 426). Automatic resolution for a newly added service 208 simply includes adding the newly added service 208 to the planned network. "Trivial" differences generally include differences that add capacity or abilities to the network or differences that do not reduce capacity or abilities to the network. Differences that reduce capacity or abilities of a service 208 are considered to be "major" differences.

Some examples of minor differences for services 208 include minor differences for any of the links 206 that make up the OCG 204 that the service 208 traverses or minor differences of the OCGs 204, themselves, that the service 208 traverses, as described above. Other minor differences include changes to service terminating equipment 308 that improve capabilities of the service 208 or do not remove capabilities of the service 208 (for example, an upgrade to equipment with greater reach would improve capabilities of the service 208), an increase in payload for the service 208 (e.g., an increased bandwidth delivery), a change from the service 208 being not "protected" to the service 208 being "protected" (e.g., 1 port protection, 2 port protection, or shared mesh protection) (thus increasing the capabilities of the service 208), and other changes that improve or do not reduce the capabilities of the service 208 (such as changes in restoration priority, meaning the priority with which the service 208 is restored after experiencing a failure, e.g., from 1 to 7, with "1" being the lowest priority and "7" being the highest priority, restoration type from/to auto and manual, or the like).

Some examples of "major" differences for services 208 include changes in the links 206 across which the OCGs 204 of the service 208 traverses, changes in the OCGs 204 across which the service 208 traverses, changes in any of the service-terminating equipment that reduces the capabilities of the service 208, a reduction in protection (e.g., protection is removed, changed, or reduced in effectiveness), a reduction in payload (e.g., bandwidth) of the service 208, or a new service 208 that conflicts with a service that exists in the planned network (e.g., occupies resources consumed by the service that exists in the planned network).

For the purpose of the method 400 illustrated in FIG. 4, no difference between the service 208 in the planned network and the service 208 in the deployed network is considered to be a "minor difference" and "automatic resolution" (step 426) involves taking no corrective action. An increase in service capabilities that does not cause a conflict with another service 208 or any changes that has no impact on service capabilities is considered a "minor difference" and is automatically incorporated from the deployed network into the planned network.

As described above, if the service 208 in the planned network has minor differences as compared with the service 208 in the deployed network, the method 400 proceeds to step 416, where the differences are automatically reconciled. Automatic resolution includes incorporating the data from the deployed network to the planned network so that the "minor" differences are nonetheless properly reflected in the planned network (e.g., a transceiver card has the correct reach type). After automatically reconciling the differences, the method proceeds to step 418, where the reconciliation system 114 determines whether there are more services 208 to analyze. If there are no more services 208, then the method 400 proceeds to step 422 and if there are more services 208, then the method returns to step 412.

If, at step 424, the reconciliation system 114 determines that there is a major difference between a service 208 in the planned network and a service 208 in the deployed network, then the method proceeds to step 430 to reconcile this conflict. At step 430, the reconciliation system 114 reconciles the difference according to an administrator choice of either the data stored in the planned network or the data reflected in the deployed network. More specifically, the reconciliation system 114 obtains a reconciliation input from an administrator that indicates whether to reconcile the difference by maintaining the differing feature in the planned network in original form (i.e., no change to the planned network for that specific difference) or to update the differing feature by incorporating the data for that feature from the deployed network.

After step 430, the method 400 proceeds to step 428, where the reconciliation system 114 determines whether any additional services 208 for analysis exist. If more services 208 exist, then the method 400 returns to step 422 and if more services 208 do not exist, then the method 400 proceeds to step 432, where the method 400 ends.

In addition to the aspects described above with respect to FIG. 4, the reconciliation system 114 is also able to perform three functions to further assist with editing planned data and reconciling differences between planned data and a deployed network. A first feature is that the reconciliation system 114 maintains the "original" planned data through the reconciliation process so that a user may, at any point in time, return to this original planned data to again attempt to reconcile the planned data with the deployed data. A second feature is that the user can at any point in time "absorb" the current changes to the planned data into the actual planned data, to generate a "new" or "updated" set of planned data with which to begin a new reconciliation technique. A third feature is that the user can ask the reconciliation system 114 to provide a summary report of the entire reconciliation process. This report would indicate exactly which changes were made to the planned data.

Note that although FIG. 4 illustrates differences being identified and then reconciled one-by-one, all differences (or some of the differences) may instead be identified and then the identified differences could be reconciled after the differences are identified. Note also that although certain specific types of differences are described above as being "major" or "minor," editable metadata could be used to define which types of differences are major and which types of differences are minor. The reconciliation system 114 would examine this metadata to determine which types of changes are major and which types are minor and then would act accordingly.

The reconciliation technique shown and described with respect to FIG. 4 can be initiated either manually, in response to a user request, or automatically, such as periodically during a user planning session or in response to some other trigger such as when new deployed data has been obtained from the deployed network.

The above techniques allow for a planner of a network (such as a fiber optic network) to keep planned data up-to-date by incorporating changes from the deployed network into the planned data. Some changes can be incorporated automatically, thus saving the planner time. Other, more drastic changes, can result in prompts to the planner, allowing the planner to either maintain the planned data as is or to incorporate data from the deployed network into the planned data. This improves the speed with which planned data for a network can be crafted and updated.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

What is claimed is:

1. A method for transmission and reconciling planned network data with deployed network data, wherein the planned network data includes data representing an editable representation of a planned network, and wherein the deployed network data includes data indicating a state of a deployed network, including a plurality of transponders and a plurality of optical fibers optically coupled to the plurality of transponders, the method comprising:

detecting a difference between a feature of the planned network data and a feature of the deployed network data;

determining whether the difference between the feature of the planned network data and the feature of the deployed network data is a difference of a first type or a difference of a second type;

if the difference between the feature of the planned network data and the feature of the deployed network data is a difference of a first type, replacing the feature of the planned network data with the feature of the deployed network data without prompting for input after determining that the difference between the feature of the planned network data and the feature of the deployed network data is a difference of a first type; and if the difference between the feature of the planned network data and the feature of the deployed network data is a difference of a second type, prompting for an input, and either replacing the feature of the planned network data with the feature of the deployed network data or maintaining the feature of the planned network data, according to the input; and based on the planned network data, transmitting optical signals from first ones of the plurality of transponders to second ones of the plurality of transponders over a corresponding ones of the plurality of optical fibers, wherein the feature of the deployed network and the planned network is a phase-shift keying modulation of the optical signals.

2. The method of claim 1, wherein:

the feature of the planned network further comprises a first link feature of a first link between optical communication nodes in the planned network;

the feature of the deployed network further comprises a second link feature of a second link between optical communication nodes in the deployed network; and determining whether the difference between the feature of the planned network data and the feature of the deployed network data is a difference of the first type or a difference of the second type comprises determining that the difference is a difference of the second type by determining that replacing the feature of the planned network with the feature of the deployed network would cause no reduction in link capacity of the first link.

3. The method of claim 1, wherein:

the feature of the planned network further comprises a first link feature of a first link between optical communication nodes in the planned network;

the feature of the deployed network further comprises a second link feature of a second link between optical communication nodes in the deployed network; and determining whether the difference between the feature of the planned network data and the feature of the deployed network data is a difference of the first type or a difference of the second type comprises determining that the difference is a difference of the first type by determining that replacing the feature of the planned network with the feature of the deployed network would cause a reduction in link capacity of the first link.

4. The method of claim 1, wherein:

the feature of the planned network further comprises a first optical channel group ("OCG") feature of a first OCG that spans one or more links between optical communication nodes in the planned network;

the feature of the deployed network further comprises a second OCG feature of a second OCG that spans one or more links between optical communication nodes in the deployed network; and determining whether the difference between the feature of the planned network data and the feature of the deployed network data is a difference of the first type or a difference of the second type comprises determining that the difference is a difference of the first type by determining that replacing the feature of the planned network with the feature of the deployed network would cause no reduction in capacity of the one or more links spanned by the first OCG in the planned network, no change in transponder equipment or multiplexer equipment through which the OCG is communicated in the planned network, no change in capacity for the first OCG, no change in modulation of optical signals comprising the first OCG, and no change in the first OCG that would be incompatible with another OCG in the planned network.

5. The method of claim 1, wherein:

the feature of the planned network further comprises a first optical channel group ("OCG") feature of a first OCG that spans one or more links between optical communication nodes in the planned network;

the feature of the deployed network further comprises a second optical channel group ("OCG") feature of a second OCG that spans one or more links between optical communication nodes in the deployed network; and determining whether the difference between the feature of the planned network data and the feature of the deployed network data is a difference of the first type or a difference of the second type comprises determining that the difference is a difference of the second type by determining that replacing the feature of the planned network with the feature of the deployed network would cause one or more of a reduction in capacity of the one or more links spanned by the first OCG in the planned network, a change in transponder equipment or multiplexer equipment through which the OCG is communicated in the planned network, a change in capacity for the first OCG, a change in modulation of optical signals comprising the first OCG, and a change in the first OCG that would be incompatible with another OCG in the planned network.

6. The method of claim 1, wherein:

the feature of the planned network further comprises a first service feature of a first service delivered via one or more optical channel groups ("OCGs") that traverse one or more links between optical communication nodes in the planned network;

the feature of the deployed network further comprises a second service feature of a second service delivered via one or more optical channel groups ("OCGs") that traverse one or more links between optical communication nodes in the deployed network; and determining whether the difference between the feature of the planned network data and the feature of the deployed network data is a difference of the first type or a difference of the second type comprises determining that the difference is a difference of the first type by determining that replacing the feature of the planned network with the feature of the deployed network would cause one or more of a change to service terminating equipment that does not reduce capabilities of the first service, an increase in payload for the first service, a change from the first service being not protected to the first service being protected.

7. The method of claim 1, wherein:

the feature of the planned network further comprises a first service feature of a first service delivered via one or more optical channel groups ("OCGs") that traverse one or more links between optical communication nodes in the planned network;

the feature of the deployed network further comprises a second service feature of a second service delivered via one or more optical channel groups ("OCGs") that traverse one or more links between optical communication nodes in the deployed network; and determining whether the difference between the feature of the planned network data and the feature of the deployed network data is a difference of the first type or a difference of the second type comprises determining that the difference is a difference of the first type by determining that replacing the feature of the planned network with the feature of the deployed network would cause one or more of a change to one or more links between nodes across which the service traverses, a change to one or more OCGs through which the service is delivered, one or more changes to service terminating equipment that reduce capabilities of the service, a reduction in protection of the service, a reduction in payload of the service, and change in a service that is incompatible with a different service in the planned network.

8. The method of claim 1, wherein:

determining whether the difference is a difference of the first type or a difference of the second type comprises identifying the type of the difference within editable metadata that indicates which types of differences are considered to be major and which types of differences are considered to be minor.

9. A computer system for transmission and reconciling planned network data with deployed network data, wherein the planned network data includes data representing an editable representation of a planned network, and wherein the deployed network data includes data indicating a state of a deployed network, the deployed network including a plurality of transponders and a plurality of optical fibers optically coupled to the plurality of transponders, the computer system comprising:

a memory storing instructions; and a processor configured to execute the instructions, the instructions causing the processor to:

detect a difference between a feature of the planned network data and a feature of the deployed network data;

determine whether the difference between the feature of the planned network data and the feature of the deployed network data is a difference of a first type or a difference of a second type;

if the difference between the feature of the planned network data and the feature of the deployed network data is a difference of a first type, replace the feature of the planned network data with the feature of the deployed network data without prompting for input after determining that the difference between the feature of the planned network data and the feature of the deployed network data is a difference of a first type; and if the difference between the feature of the planned network data and the feature of the deployed network data is a difference of a second type, prompt for an input, and either replace the feature of the planned network data with the feature of the deployed network data or maintain the feature of the planned network data, according to the input; and based on the planned network data, control the plurality of transponders to transmit optical signals from first ones of the plurality of transponders to second ones of the plurality of transponders over a corresponding ones of the plurality of optical fibers, wherein the feature of the deployed network and the planned network is a phase-shift keying modulation of the optical signals.

10. The computer system of claim 9, wherein:
the feature of the planned network further comprises a first link feature of a first link between optical communication nodes in the planned network;
the feature of the deployed network further comprises a second link feature of a second link between optical communication nodes in the deployed network; and
determining whether the difference between the feature of the planned network data and the feature of the deployed network data is a difference of the first type or a difference of the second type comprises determining that the difference is a difference of the second type by determining that replacing the feature of the planned network with the feature of the deployed network would cause no reduction in link capacity of the first link.

11. The computer system of claim 9, wherein:
the feature of the planned network further comprises a first link feature of a first link between optical communication nodes in the planned network;
the feature of the deployed network further comprises a second link feature of a second link between optical communication nodes in the deployed network; and
determining whether the difference between the feature of the planned network data and the feature of the deployed network data is a difference of the first type or a difference of the second type comprises determining that the difference is a difference of the first type by determining that replacing the feature of the planned network with the feature of the deployed network would cause a reduction in link capacity of the first link.

12. The computer system of claim 9, wherein:
the feature of the planned network further comprises a first optical channel group ("OCG") feature of a first OCG that spans one or more links between optical communication nodes in the planned network;
the feature of the deployed network further comprises a second OCG feature of a second OCG that spans one or more links between optical communication nodes in the deployed network; and
determining whether the difference between the feature of the planned network data and the feature of the deployed network data is a difference of the first type or a difference of the second type comprises determining that the difference is a difference of the first type by determining that replacing the feature of the planned network with the feature of the deployed network would cause no reduction in capacity of the one or more links spanned by the first OCG in the planned network, no change in transponder equipment or multiplexer equipment through which the OCG is communicated in the planned network, no change in capacity for the first OCG, no change in modulation of optical signals comprising the first OCG, and no change in the first OCG that would be incompatible with another OCG in the planned network.

13. The computer system of claim 9, wherein:
the feature of the planned network further comprises a first optical channel group ("OCG") feature of a first OCG that spans one or more links between optical communication nodes in the planned network;
the feature of the deployed network further comprises a second optical channel group ("OCG") feature of a second OCG that spans one or more links between optical communication nodes in the deployed network; and
determining whether the difference between the feature of the planned network data and the feature of the deployed network data is a difference of the first type or a difference of the second type comprises determining that the difference is a difference of the second type by determining that replacing the feature of the planned network with the feature of the deployed network would cause one or more of a reduction in capacity of the one or more links spanned by the first OCG in the planned network, a change in transponder equipment or multiplexer equipment through which the OCG is communicated in the planned network; a change in capacity for the first OCG, a change in modulation of optical signals comprising the first OCG, and a change in the first OCG that would be incompatible with another OCG in the planned network.

14. The computer system of claim 9, wherein:
the feature of the planned network further comprises a first service feature of a first service delivered via one or more optical channel groups ("OCGs") that traverse one or more links between optical communication nodes in the planned network;
the feature of the deployed network further comprises a second service feature of a second service delivered via one or more optical channel groups ("OCGs") that traverse one or more links between optical communication nodes in the deployed network; and
determining whether the difference between the feature of the planned network data and the feature of the deployed network data is a difference of the first type or a difference of the second type comprises determining that the difference is a difference of the first type by determining that replacing the feature of the planned network with the feature of the deployed network would cause one or more of a change to service terminating equipment that does not reduce capabilities of the first service, an increase in payload for the first service, a change from the first service being not protected to the first service being protected.

15. The method of claim 9, wherein:
the feature of the planned network further comprises a first service feature of a first service delivered via one or more optical channel groups ("OCGs") that traverse one or more links between optical communication nodes in the planned network;
the feature of the deployed network further comprises a second service feature of a second service delivered via one or more optical channel groups ("OCGs") that traverse one or more links between optical communication nodes in the deployed network; and
determining whether the difference between the feature of the planned network data and the feature of the deployed network data is a difference of the first type or a difference of the second type comprises determining that the difference is a difference of the first type by determining that replacing the feature of the planned network with the feature of the deployed network would cause one or more of a change to one or more links between nodes across which the service traverses, a change to one or more OCGs through which the service is delivered, one or more changes to service terminating equipment that reduce capabilities of the service, a reduction in protection of the service, a reduction in payload of the service, and change in a service that is incompatible with a different service in the planned network.

16. The computer system of claim 10, wherein:
determining whether the difference is a difference of the first type or a difference of the second type comprises identifying the type of the difference within editable metadata that indicates which types of differences are considered to be major and which types of differences are considered to be minor.

17. A non-transitory computer-readable medium storing instructions that, when executed by a processor, cause the processor to perform a method for transmission and reconciling planned network data with deployed network data, wherein the planned network data includes data representing an editable representation of a planned network, and wherein the deployed network data includes data indicating a state of a deployed network, the deployed network including a plurality of transponders and a plurality of optical fibers optically coupled to the plurality of transponders, the method comprising:
detecting a difference between a feature of the planned network data and a feature of the deployed network data;
determining whether the difference between the feature of the planned network data and the feature of the deployed network data is a difference of a first type or a difference of a second type;
if the difference between the feature of the planned network data and the feature of the deployed network data is a difference of a first type, replacing the feature of the planned network data with the feature of the deployed network data without prompting for input after determining that the difference between the feature of the planned network data and the feature of the deployed network data is a difference of a first type; and
if the difference between the feature of the planned network data and the feature of the deployed network data is a difference of a second type, prompting for an input, and either replacing the feature of the planned network data with the feature of the deployed network data or maintaining the feature of the planned network data, according to the input; and
based on the planned network data, transmitting optical signals from first ones of the plurality of transponders to second ones of the plurality of transponders over a corresponding ones of the plurality of optical fibers,
wherein the feature of the deployed network and the planned network is a phase-shift keying modulation of the optical signals.

18. The non-transitory computer-readable medium of claim 17, wherein:
the feature of the planned network further comprises a first link feature of a first link between optical communication nodes in the planned network;
the feature of the deployed network further comprises a second link feature of a second link between optical communication nodes in the deployed network; and
determining whether the difference between the feature of the planned network data and the feature of the deployed network data is a difference of the first type or a difference of the second type comprises determining that the difference is a difference of the second type by determining that replacing the feature of the planned network with the feature of the deployed network would cause no reduction in link capacity of the first link.

19. The non-transitory computer-readable medium of claim 17, wherein:
the feature of the planned network further comprises a first link feature of a first link between optical communication nodes in the planned network;
the feature of the deployed network further comprises a second link feature of a second link between optical communication nodes in the deployed network; and
determining whether the difference between the feature of the planned network data and the feature of the deployed network data is a difference of the first type or a difference of the second type comprises determining that the difference is a difference of the first type by determining that replacing the feature of the planned network with the feature of the deployed network would cause a reduction in link capacity of the first link.

20. The non-transitory computer-readable medium of claim 17, wherein:
the feature of the planned network further comprises a first optical channel group ("OCG") feature of a first OCG that spans one or more links between optical communication nodes in the planned network;

the feature of the deployed network further comprises a second OCG feature of a second OCG that spans one or more links between optical communication nodes in the deployed network; and determining whether the difference between the feature of the planned network data and the feature of the deployed network data is a difference of the first type or a difference of the second type comprises determining that the difference is a difference of the first type by determining that replacing the feature of the planned network with the feature of the deployed network would cause no reduction in capacity of the one or more links spanned by the first OCG in the planned network, no change in transponder equipment or multiplexer equipment through which the OCG is communicated in the planned network, no change in capacity for the first OCG, no change in modulation of optical signals comprising the first OCG, and no change in the first OCG that would be incompatible with another OCG in the planned network.

21. The non-transitory computer-readable medium of claim 17, wherein:

the feature of the planned network further comprises a first optical channel group ("OCG") feature of a first OCG that spans one or more links between optical communication nodes in the planned network;

the feature of the deployed network further comprises a second optical channel group ("OCG") feature of a second OCG that spans one or more links between optical communication nodes in the deployed network; and determining whether the difference between the feature of the planned network data and the feature of the deployed network data is a difference of the first type or a difference of the second type comprises determining that the difference is a difference of the second type by determining that replacing the feature of the planned network with the feature of the deployed network would cause one or more of a reduction in capacity of the one or more links spanned by the first OCG in the planned network, a change in transponder equipment or multiplexer equipment through which the OCG is communicated in the planned network, a change in capacity for the first OCG, a change in modulation of optical signals comprising the first OCG, and a change in the first OCG that would be incompatible with another OCG in the planned network.

22. The non-transitory computer-readable medium of claim 17, wherein:

the feature of the planned network further comprises a first service feature of a first service delivered via one or more optical channel groups ("OCGs") that traverse one or more links between optical communication nodes in the planned network;

the feature of the deployed network further comprises a second service feature of a second service delivered via one or more optical channel groups ("OCGs") that traverse one or more links between optical communication nodes in the deployed network; and determining whether the difference between the feature of the planned network data and the feature of the deployed network data is a difference of the first type or a difference of the second type comprises determining that the difference is a difference of the first type by determining that replacing the feature of the planned network with the feature of the deployed network would cause one or more of a change to service terminating equipment that does not reduce capabilities of the first service, an increase in payload for the first service, a change from the first service being not protected to the first service being protected.

23. The non-transitory computer-readable medium of claim 17, wherein:

the feature of the planned network further comprises a first service feature of a first service delivered via one or more optical channel groups ("OCGs") that traverse one or more links between optical communication nodes in the planned network;

the feature of the deployed network further comprises a second service feature of a second service delivered via one or more optical channel groups ("OCGs") that traverse one or more links between optical communication nodes in the deployed network; and determining whether the difference between the feature of the planned network data and the feature of the deployed network data is a difference of the first type or a difference of the second type comprises determining that the difference is a difference of the first type by determining that replacing the feature of the planned network with the feature of the deployed network would cause one or more of a change to one or more links between nodes across which the service traverses, a change to one or more OCGs through which the service is delivered, one or more changes to service terminating equipment that reduce capabilities of the service, a reduction in protection of the service, a reduction in payload of the service, and change in a service that is incompatible with a different service in the planned network.

24. The non-transitory computer-readable medium of claim 17, wherein:

determining whether the difference is a difference of the first type or a difference of the second type comprises identifying the type of the difference within editable metadata that indicates which types of differences are considered to be major and which types of differences are considered to be minor.

* * * * *